(12) United States Patent
Soskind (10) Patent No.: US 6,262,844 B1
(45) Date of Patent: Jul. 17, 2001

(54) OPTICAL SYSTEMS EMPLOYING STEPPED DIFFRACTIVE SURFACES

(75) Inventor: Yakov G. Soskind, Columbus, IN (US)

(73) Assignee: KSM Associates, Inc., Cincinnati, OH (US)

( * ) Notice: Subject to any disclaimer, the term of this patent is extended or adjusted under 35 U.S.C. 154(b) by 0 days.

(21) Appl. No.: 09/384,819

(22) Filed: Aug. 27, 1999

Related U.S. Application Data
(60) Provisional application No. 60/098,268, filed on Aug. 28, 1998.

(51) Int. Cl.$^7$ ................................. G02B 5/18; G02B 3/08
(52) U.S. Cl. ........................... 359/565; 359/572; 359/569
(58) Field of Search ..................................... 359/565, 569, 359/570, 572, 15, 16, 19

(56) References Cited

U.S. PATENT DOCUMENTS

| | | |
|---|---|---|
| 5,044,706 | 9/1991 | Chen . |
| 5,153,778 | 10/1992 | Sasian-Alvarado . |
| 5,260,828 | 11/1993 | Londono et al. . |
| 5,446,588 | 8/1995 | Missig et al. . |
| 5,504,628 | 4/1996 | Borchard . |
| 5,581,405 | 12/1996 | Meyers et al. . |
| 5,589,982 | 12/1996 | Faklis et al. . |
| 5,629,799 * | 5/1997 | Maruyama et al. ................ 359/565 |
| 5,691,847 | 11/1997 | Chen . |
| 5,726,436 | 3/1998 | Oka et al. . |
| 5,737,120 | 4/1998 | Arriola . |
| 5,745,289 | 4/1998 | Hamblen . |
| 5,745,301 | 4/1998 | Betensky et al. . |
| 5,768,030 | 6/1998 | Estelle et al. . |
| 5,796,520 | 8/1998 | Maruyama . |
| 5,808,799 * | 9/1998 | Klocek ................ 359/619 |
| 5,822,127 | 10/1998 | Chen et al. . |
| 5,883,774 | 3/1999 | Maruyama . |

OTHER PUBLICATIONS

Behrmann et al., "Influence of temperature on diffractive lens performance," *Appl. Opt.*, 1993, 32:2483–2489.

(List continued on next page.)

*Primary Examiner*—Jon Henry
(74) *Attorney, Agent, or Firm*—Maurice M. Klee (57) ABSTRACT

Stepped diffractive surfaces (13) are used to reduce variations in the optical properties of an optical system as a result of a change in the temperature of all or a portion of the system. Such surfaces have optothermal coefficients which differ from the optothermal coefficients of both kinoforms and refractive elements. Accordingly, stepped diffractive surfaces can be combined with such elements to achieve overall thermal control of optical systems employing such elements.

25 Claims, 5 Drawing Sheets

OTHER PUBLICATIONS

Buralli, D. A., "Optical design with diffractive lenses," *Sinclair Optics Design Notes*, V. 2, No. 4, 1991.

*Code V Reference Manual*, Version 8.20, Optical Research Associates, Pasadena, California, vol. 1, pp. 2A–433 — 2A–434, 1998.

Grey, D. S., "Athermalization of Optical Systems," *Josa*, 1948, 38:542–546.

*Handbook of Optics*, $2^{nd}$ ed ., M. Bass editor, McGraw–Hill, Inc., New York, 1995, vol. I, 32.15–32.16.

*Handbook of Optics*, $2^{nd}$ ed., M. Bass editor, McGraw–Hill, Inc., New York, 1995, vol. II, 8.1–8.19.

Jamieson, T.H., "Thermal Effects in optical systems," *Opt. Eng.*, 1981, 20:156–160.

Johnson et al., "Rigorous Electromagnetic Modeling of Diffractive Optical Elements," *Proceedings SPIE*, vol. 1545, 1991, pp. 209–216.

Kryszcynski et al., "Material problem in athermalization of optical systems," *Opt. Eng.*, 1997, 36:1596–1601.

Londono et al., "Athermalization of single–component lens with diffraction optics," *Appl. Opt.*, 1993, 32:2295–2302.

Londono, et al., "The design of achromatized hybrid diffractive lens system," *Proceedings SPIE*, 1354:30–37, 1990.

Moharam et al., "Diffraction Analysis of Dielectric Surface–Relief Gratings," *Josa*, 72:1385–1392, 1982.

*Oslo Version 5, Optics Reference*, Sinclair Optics, Inc., Fairport, New York, pp. 359–361, 1996.

Sasian–Alvarado et al., "Staircase lens: a binary and diffractive field curvature corrector," *Applied Optics*, 1993, vol. 32:60–66.

Sinclair, D. C., "Designing Diffractive Optics Using The Sweatt Model", *Sinclair Optics Designs Notes*, Fairport, New York, vol. 1, No. 1, Winter 1990

Southwell, W.H., Ray Tracing Kinoform Lens Surfaces, *Applied Optics*, 1992, 31:2244–2247.

Spencer et al., "General Ray–Tracing Procedure," *Josa*, 52:672–678, 1962.

Swanson, G. J., *Binary Optics Technology: Theoretical Limits on the Diffractive Efficiency of Multilevel Diffractive Optical Elements*, Massachusetts Institute of Technology Lincoln Laboratory, Technical Report 914, Lexington, Massachusetts, Mar. 1, 1991.

Sweatt, W.C., "Describing Holographic Optical Elements As Lenses," *Josa*, V. 67, pp. 803–808, 1977.

Sweatt, W. C., "Mathematical Equivalence Between A Holographic Optical Element And An Ultra–High Index Lens," *Josa*, V. 69, pp. 486–487, 1979.

Tamagawa et al., "Dual–band optical systems with a project athermal chart: design," *Appl. Opt.*, 1997, 36:297–301.

Tudorovskii, A. I., "An Objective with al Phase Plate," *Optics and Spectroscopy*, vol. 6(2), pp. 126–133 (Feb. 1959).

Welford, W. T., "Vector Raytracing Equation For Hologram Lenses of Arbitrary Shape," *Opt. Commun.*, V. 14, 322–323, 1975.

*Zemax Optical Design Program, User's Guide*, Version 7.0, pp. 13–23, Focus Software Inc., Tucson, Arixona, 1998.

Sweeney et al., "Harmonic diffractive lenses," *Appl. Opt.*, V. 34 (14), pp. 2469–2475, 1995.

Faklis et al., "Spectral properties of multiorder diffractive lenses," *Appl. Opt.*, , V. 34(14), pp. 2462–2468, 1995.

Londono et al., "Modeling diffraction efficiency effects when designing hybrid diffractive lens systems," Appl. Opt., V. 31 (13), pp. 2248–2252, 1992.

Stone et al., "Hybrid diffractive–refractive lenses and achromats, " *Appl. Opt.*, , V. 27(14), pp. 2960–2971.

Swanson et al., "Binary lenses for use at 10.6 micrometers," *Opt. Eng.*, , V. 24 (5), pp. 791–795, 1985.

Swanson et al., "Diffraction optical elements for use in infrared systems," *Opt. Eng.*, V. 28 (6), pp. 605–608, 1989.

Swanson, G. J., "Binary optics technology: the theory and design of multi–level diffractive optical elements," MIT Lincoln Laboratory Tech. Rep. 854, Lexington, Massachusetts, 1989.

Welch, H., "Fabrication Issues for DOE Design," *CODE V News Supplement*, Summer 1996.

* cited by examiner

OPTICAL SYSTEMS EMPLOYING STEPPED DIFFRACTIVE SURFACES

CROSS REFERENCE TO RELATED PROVISIONAL APPLICATION

This application claims the benefit under 35 USC §119(e) of U.S. Provisional Application No. 60/098,268 filed Aug. 28, 1998, the content of which in its entirety is hereby incorporated by reference.

I. FIELD OF THE INVENTION

This invention relates to optical systems employing stepped diffractive surfaces (SDSs). More particularly, in accordance with certain of its aspects, the invention relates to the athermalization of optical systems by means of one or more stepped diffractive surfaces.

II. BACKGROUND OF THE INVENTION

A. Athermalization

As known in the art, the optical properties of an optical system normally vary with changes in temperature as a result of: (i) changes in the indices of refraction of the optical materials used in the system, (ii) changes in the shape of the optical elements used in the system, (iii) changes in the dimensions of the housing used to hold the optical elements, and (iv) changes in the wavelength or frequency of the light source employed in the system.

Such changes in optical properties with changes in temperature are undesirable and extensive efforts have been made to solve this problem, examples of which can be found in the following patents and literature references: Londono et al., U.S. Pat. No. 5,260,828; Borchard, U.S. Pat. No. 5,504,628; Behrmann et al., "Influence of temperature on diffractive lens performance," *Appl. Opt.*, 1993, 32: 2483–2489; D. S. Grey, "Athermalization of Optical Systems," *JOSA*, 1948, 38:542–546; T. H. Jamieson, "Thermal effects in optical systems," *Opt. Eng.*, 1981, 20:156–160; Kryszcynski et al., "Material problem in athermalization of optical systems," *Opt. Ens.*, 1997, 36:1596–1601; Londono et al., "Athermalization of a single-component lens with diffractive optics," *Appl. Opt.*, 1993, 32:2295–2302; Tamagawa et al., "Dual-band optical systems with a projective athermal chart: design," *Appl. Opt.*, 1997, 36:297–301; and Handbook of Optics, 2nd ed., M. Bass editor, McGraw-Hill, Inc., New York, 1995, volume I, 32.15–32.16.

The thermal behavior of an optical surface can be described in terms of the surface's "optothermal" coefficient defined as:

$$X_\Phi = \frac{1}{\Phi}\frac{d\Phi}{dT} \quad (I)$$

where "$\Phi$" is optical power and "T" is temperature.

For a refractive surface separating a first medium having an index of refraction $n_1$ and a second medium having an index of refraction $n_2$, $X_{\Phi,R}$ is given by:

$$X_{\Phi,R} = \frac{1}{(n_2-n_1)}\left(\frac{dn_2}{dT} - \frac{dn_1}{dT}\right) - \alpha \quad (II)$$

where $\alpha$ is the coefficient of thermal expansion of the substrate medium (i.e., the solid medium which forms the refractive surface) and where the paraxial optical power of the surface, $\Phi_R$, is given by:

$$\Phi_R = \frac{(n_2 - n_1)}{R_0}$$

where $R_0$ is the vertex radius of the refractive surface.

The corresponding expression for a diffractive kinoform surface is:

$$X_{\Phi,K} = -2\alpha \quad (III)$$

where again $\alpha$ is the coefficient of thermal expansion of the substrate medium (in this case, the solid medium which forms the kinoform surface) and where the paraxial optical power of the surface, $\Phi_K$, is given by:

$$\Phi_K = \frac{8N\lambda_0}{(D_0)^2}$$

where $D_0$ is the clear aperture diameter of the kinoform surface, N is the total number of zones within the clear aperture, and $\lambda_0$ is the system's nominal operating wavelength.

Table 1 sets forth values of $X_{\Phi,R}$ and $X_{\Phi,K}$ for various optical materials which can be used in the visible, infra-red (IR), or ultra-violet (UV) regions of the spectrum, as well as ratios of $X_{\Phi,K}$ to $X_{\Phi,R}$ for these materials. For Si and Ge, the fact that the optothermal coefficients for kinoforms are much smaller than those for refractive components can make it difficult to athermalize a refractive system composed of these materials with a kinoform. For these as well as the other materials in this table, the use of a kinoform can complicate the athermalization process since unlike stepped diffractive surfaces (see below), kinoforms introduce optical power into the system at the system's nominal operating wavelength ($\lambda_0$).

B. Stepped Diffractive Surfaces

Figure 1A:
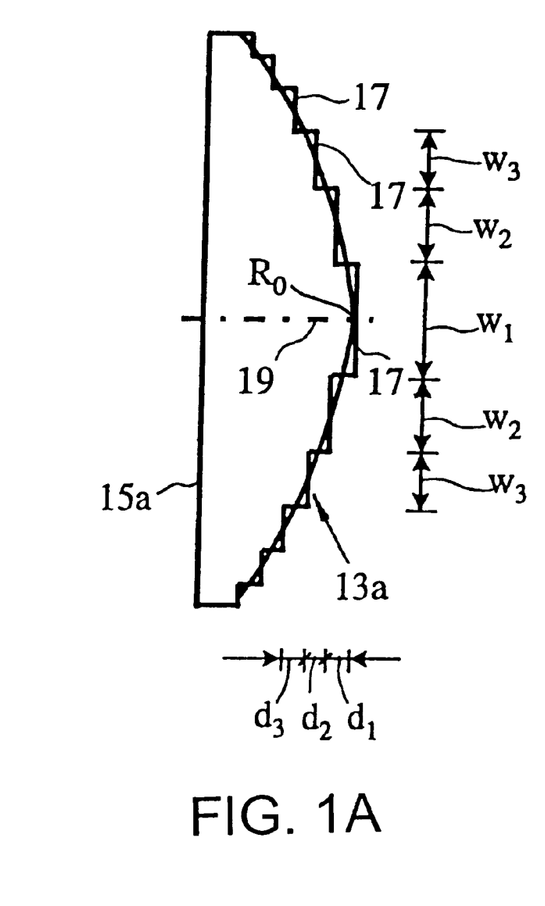
FIGS. 1A and 1B are schematic drawings of stepped diffractive surfaces having a base curve whose vertex radius is $R_0$.
Figure 1B:
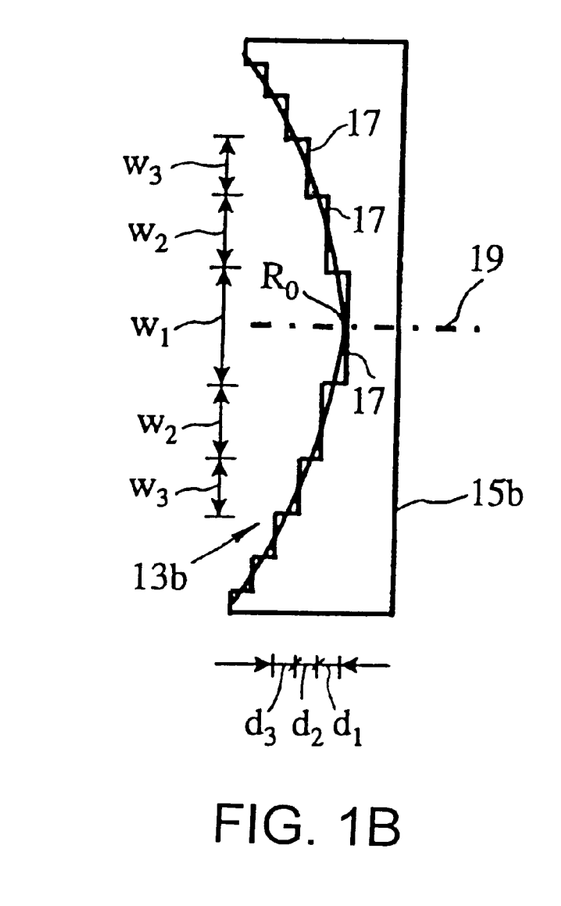

FIGS. 1A and 1B illustrate optical elements employing stepped diffractive surfaces 13a and 13b of the type with which the present invention is concerned. To simplify these drawings, opposing surfaces 15a and 15b of these elements have been shown as planar. In the general case, the opposing surfaces can have optical power or can be another stepped diffractive surface, if desired.

As shown in these figures, stepped diffractive surfaces 13 comprise a plurality of concentric planar zones 17 (also referred to as "steps") which are orthogonal to optical axis 19. The zones lie on a base curve which is shown as part of a circle in FIGS. 1A and 1B, but in the general case can be any curve of the type used in optical design, including conics, polynomial aspheres, etc. The base curve may also constitute a base surface in cases where the concentric planer zones are not axially symmetric, i.e., where their widths are a function of $\theta$ in an (r, $\theta$, z) cylindrical coordinate system having its z-axis located along the system's optical axis. For ease of reference, the phrase "base curve" will be used herein and in the claims to include both the axially symmetric and axially non-symmetric cases, it being understood that in the non-symmetric case, the base curve is, in fact, a base surface. In either case, the base curve can be characterized by a vertex radius Ro which, as discussed below, can be used in calculating the paraxial properties of the stepped diffractive surface.

The stepped diffractive surfaces of the invention are distinguished from digitized (binary) kinoforms by the fact that the sag of the stepped diffractive surface changes monotonically as the zone number increases. The sag of the surface of a binary kinoform, on the other hand, always exhibits a reversal in direction at some, and usually at many, locations on the surface. This is so even if the base curve for the binary kinoform has a monotonic sag.

Quantitatively, the zones of the stepped diffractive surface preferably have widths ($w_i$) and depths ($d_i$) which satisfy some or all of the following relationships:

$$|d_i|\backslash|d_{i+1}|<2.0, \text{ for } i=1 \text{ to } N-2;$$

$$|d_i|=j_i\lambda_0/|(n_2-n_1)|, \text{ for } i=1 \text{ to } N-1;$$

and $$w_i/\lambda_0>1.0, \text{ for } i=1 \text{ to } N;$$

where "$j_i$" is the order of the ith zone of the stepped diffractive surface ($j_i>1$), N is the total number of zones (N=6 in FIGS. 1A and 1B), and "$n_1$" and "$n_2$" are the indices of refraction of the media on either side of the stepped diffractive surface, with light traveling through the stepped diffractive surface from the $n_1$ medium to the $n_2$ medium.

The "$j_i$" nomenclature is used in the above equations to indicate that the working order of the stepped diffractive surface can be different for different zones. In many cases, the same working order will be used for all zones; however, for manufacturing reasons, it may be desirable to use different working orders for some zones, e.g., if the zone width wi would become too small for accurate replication with a constant working order, especially, for a constant working order of 1. In this regard, it should be noted that $j_i$ can be made greater than 1 for all zones, again to facilitate manufacture of the stepped diffractive surface by, for example, reducing the overall number of zones comprising the surface and, at the same time, increasing the depth and width of the individual steps.

Like the monotonic sag characteristic, the $|d_i|\backslash|d_{i+1}|<2.0$ characteristic distinguishes the diffractive surfaces of the invention from digitized (binary) kinoforms, where $|d_i|\backslash|d_{i+1}|$ is normally greater than 2.0 for at least some steps, i.e., where the kinoform profile returns to the base curve. The $|d_i|=j_i\lambda_0/|(n_2-n_1)|$ characteristic in combination with the requirement that $j_i \geq 1$ also distinguish the stepped diffractive surfaces of the invention from digitized kinoforms in that this expression calls for an optical path difference for each step of at least $j_i\lambda_0$ while for a digitized kinoform of the same diffractive order the optical path difference for each step is at most $j_i\lambda_0/2$ in the case of a two level digitization and becomes even smaller for the digitizations actually used in practice, e.g., an eight or sixteen level digitization. The $w_i/\lambda_0>1.0$ characteristic affects the efficiency of the stepped diffractive surface, with larger ratios generally corresponding to greater efficiencies. See G. J. Swanson, *Binary Optics Technology: Theoretical Limits on the Diffraction Efficiency of Multilevel Diffractive Optical Elements*, Massachusetts Institute of Technology Lincoln Laboratory Technical Report 914, Mar. 1, 1991, p.24.

It should be noted that when a stepped diffractive surface is incorporated in an optical element as illustrated in FIGS. 1A and 1B, the optical material making up the element can have an index of refraction greater than or less than the surrounding medium. Also, light can pass from left to right or from right to left through the element. Thus, for a stepped diffractive surface which transmits light, four cases are possible: 1) passage from a higher index of refraction medium to a lower index of refraction medium through a concave stepped diffractive surface; 2) passage from a lower index of refraction medium to a higher index of refraction medium through a concave stepped diffractive surface; 3) passage from a higher index of refraction medium to a lower index of refraction medium through a convex stepped diffractive surface; and 4) passage from a lower index of refraction medium to a higher index of refraction medium through a convex stepped diffractive surface. As further variations, rather than transmitting light, the stepped diffractive surface 13 can be reflective. Combinations of these various cases can, of course, be used in optical systems which employ the invention.

C. Prior Disclosures of Stepped Diffractive Surfaces

The earliest reference discussing the use of a stepped diffractive surface in an optical system is A. I. Tudorovskii, "An Objective with a Phase Plate," *Optics and Spectroscopy*, Vol. 6(2), pp. 126–133 (February 1959). The optical system considered by Tudorovskii was a telescope objective and the stepped diffractive surface was designed to correct the system's secondary color. Significantly, with regard to the present invention, the Tudorovskii article does not provide any disclosure regarding athermalizing an optical system with a stepped diffractive surface.

U.S. Pat. No. 5,153,778, which issued to Jose M. Sasian-Alvarado in 1992, also discloses a stepped diffractive surface. The Sasian-Alvarado system is monochromatic and the stepped diffractive surface is said to be useful for correcting field curvature and/or spherical aberration. With regard to the present invention, this patent does not mention employing a stepped diffractive surface to achieve athermalization.

In 1993, Jose M. Sasian-Alvarado and Russell A. Chipman published an article on stepped diffractive surfaces entitled "Staircase lens: a binary and diffractive field curvature corrector," *Applied Optics*, Vol. 32, No. 1, Jan. 1, 1993, pages 60–66. Again, no mention of athermalization was made in connection with this discussion of stepped diffractive surfaces.

Finally, U.S. Pat. No. 5,629,799, which issued to Maruyama et al. in 1997, discloses the use of stepped diffractive surfaces to correct chromatic aberrations in optical disc readers. Once again, the use of a stepped diffractive surface to achieve athermalization is not mentioned.

In addition to not disclosing the use of stepped diffractive surfaces to achieve athermalization, none of the above prior disclosures provides a ray tracing technique which explicitly specifies the spacing and blaze angle of the steps of an SDS. Among other things, the lack of such a ray tracing technique means that these references cannot account for the actual physical changes to the microstructure of the surface which occur as a result of a change in temperature.

III. SUMMARY OF THE INVENTION

In view of the foregoing, it is an object of the invention to provide improved methods for incorporating stepped diffractive surfaces into optical systems. In accordance with certain of its aspects, it is an object of the invention to provide methods and apparatus for compensating for changes in the optical properties of an optical system as a result of changes in the temperature of all or a portion of the system. More particularly, it is an object of the invention to provide methods and apparatus for achieving such compensation which employ one or more stepped diffractive surfaces. It is an additional object of the invention, to provide such methods and apparatus wherein the stepped diffractive surface or surfaces are used in combination with other techniques for compensating for thermal changes of an optical system, e.g., techniques which employ kinoform surfaces and/or techniques which employ mechanical compensation (see, for example, Kryszcynski et al., supra).

To achieve these and other objects, the invention in accordance with certain of its aspects provides an optical system which (i) has an optical axis and (ii) has an operating temperature within a range of temperatures, said system comprising:

(a) at least one stepped diffractive surface which comprises N concentric planar zones orthogonal to the system's optical axis which define a base curve, said stepped diffractive surface having a clear aperture and a sag which changes monotonically from the optical axis to the clear aperture, i.e., the sag changes monotonically with zone number;

(b) at least one optical surface which (i) is not a stepped diffractive surface and (ii) has a non-zero optical power; and (c) a housing which supports the at least one stepped diffractive surface and the at least one optical surface;

wherein the at least one stepped diffractive surface compensates for changes in the at least one optical surface and/or the housing as a result of changes in the system's operating temperature.

In certain embodiments, the zones satisfy some or all of the following relationships:

$|d_i|\backslash|d_{i+1}|<2.0$, for $i=1$ to $N-2$;

$|d_i|=j_i\lambda_0/|(n_2-n_1)|$, for $i=1$ to $N-1$;

and/or $w_i/\lambda_0>1.0$, for $i=1$ to $N$.

The compensation provided by the stepped diffractive surface will in general reduce variation in one or more specified optical properties of the optical system, e.g., image location in those cases where the optical system forms an image of an object, output power in those cases where the optical system is an optical source, focal length, magnification, etc., as a result of a change in the system's operating temperature. Preferably, the compensation will hold the one or more specified optical properties substantially constant to a desired extent for all operating temperatures within the range of temperatures for at least one operating wavelength, e.g., $\lambda_0$. Alternatively, the compensation can result in a variation in an optical property in a desired manner, e.g., a substantially linear variation with temperature for an optical system which is designed to sense temperature.

The degree of constancy which the compensation needs to achieve will, of course, depend upon the particular application of the optical system, e.g., on the specifications which have been established for the system. As known in the art, the effect of temperature on refractive index is nonlinear. For optical materials with well defined and consistent properties, such as optical glasses, the change in refractive index with temperature dn/dT can usually be approximated by a constant over a temperature range of, for example, 20° C. For a wider temperature range, the ability to control the change in the system's optical properties with a change in temperature will be reduced, with the magnitude of the uncontrolled residual being a function of the temperature range and the working wavelength, and usually being small. For materials such as plastics, an additional consideration is the ability to control the refractive index of the plastic material through the manufacturing process and during use of the system. For example, the refractive index can differ between different batches of raw material and can change as a result of moisture absorption. Based on considerations of this type, persons skilled in the art will know the level of constancy which can be achieved and is desired for particular applications of the invention.

It should be noted that the "operating temperature" of the optical system need not constitute a single temperature, but rather can comprise different temperatures for different parts of the system, with those different temperatures undergoing the same or different changes as a result of changes in the environment in which the optical system is used and/or internal heat generated by or within the system.

In certain embodiments, the at least one optical surface is a refractive surface, or a reflective surface, or a kinoform located on a plane surface or a curved surface. The at least one stepped diffractive surface and the at least one optical surface can be located on the same or different lens elements.

When located on the same lens element, the invention, in its limiting case, provides a single lens element which has a stepped diffractive surface on one side and an optical surface with non-zero optical power on the other side wherein the stepped diffractive surface compensates for a change in the optical surface with non-zero optical power as a result of a change in the element's temperature. As above, the compensation preferably holds one or more optical properties of the element substantially constant over a predetermined range of temperatures for at least one operating wavelength, where the level of constancy will depend on the particular application for the thermally compensated element.

In accordance with others of its aspects, the invention provides a method for reducing or controlling to a desired extent the change in an optical property of an optical system resulting from a change in the temperature of at least a portion of the system, said method comprising incorporating at least one stepped diffractive surface in the system and selecting the base curve and the step depth(s) of the surface at least in part to achieve the desired reduction or control of the thermal variation of the optical property. As with the apparatus aspects of the invention, the control of the optical property preferably holds the property substantially constant over a predetermined range of temperatures for at least one operating wavelength, the level of constancy again depending on the particular application of the invention.

In accordance with further aspects of the invention, the compensation for thermal changes whether in an apparatus or method context is performed based on the following optothermal coefficient for a stepped diffractive surface:

$$X_{\Phi,SDS} = \frac{1}{(n_2-n_1)}\left(\frac{dn_1}{dT} - \frac{dn_2}{dT}\right) - \alpha \quad \text{(IV)}$$

where $\alpha$ is again the coefficient of thermal expansion of the substrate surface, i.e., the solid medium which forms the stepped diffractive surface. A comparison of this equation with equations (II) and (III) shows that:

$X_{\Phi,SDS}=-X_{\Phi,R}-2\alpha$ or $X_{\Phi,SDS}=X_{\Phi,K}-X_{\Phi,R}$ for a stepped diffractive surface, a refractive surface, and a kinoform surface having the same $n_1$, $n_2$, and $\alpha$ values.

The optothermal coefficients for a refractive lens and a kinoform surface set forth in equations (II) and (III) are used in expressions of the following type to determine the change in power $\Delta\Phi$ as a result of a change in temperature $\Delta T$:

$\Delta\Phi=\Phi\cdot X_\Phi\cdot\Delta T$.

Overall thermal stability for an optical system having both refractive and kinoform components can then be achieved by balancing the thermal changes in these components against one another (as well as against any changes in the dimensions of the housing for the optical system) so that the overall change in power of the system $\Delta\Phi_{system}$ is substantially equal to zero. For the simplest case of one refractive component, one kinoform component, a constant source wavelength, a common temperature change for both components, and a thermally invariant housing, the condition of substantial thermal stability can be written:

$$\Delta\Phi_{system} = \Delta\Phi_R + \Delta\Phi_K \approx 0 \quad \text{(V)}$$

or $$\Phi_R \cdot X_{\Phi,R} \approx -\Phi_K \cdot X_{\Phi,K}$$

where $\Phi_R$ and $\Phi_K$ are the paraxial powers of the refractive and kinoform surfaces, respectively, at, for example, the initial temperature of the system, and $X_{\Phi,R}$ and $X_{\Phi,K}$ are as defined above in equations (II) and (III), respectively.

The above approach cannot be used directly with a stepped diffractive surface since such surfaces are typically designed to have zero paraxial optical power at the system's nominal operating wavelength ($\lambda_0$). In accordance with the invention, this problem is addressed by using the following expression for the effective paraxial optical power $\Phi_{SDS}^{Eff}$ of a stepped diffractive surface:

$$\Phi_{SDS}^{Eff} = -\frac{(n_2 - n_1)}{R_0} \quad \text{(VI)}$$

where $R_0$ is the vertex radius of the surface's base curve.

The change in paraxial power $\Delta\Phi_{SDS}$ of the stepped diffractive surface at $\lambda_0$ with a change in temperature $\Delta T$ can then be written:

$$\Delta\Phi_{SDS} = \Phi_{SDS}^{Eff} \cdot X_{\Phi,SDS} \cdot \Delta T.$$

Defined in this way, $\Delta\Phi_{SDS}$ can be used along with $\Delta\Phi_R$ and/or $\Delta\Phi_K$ in an equation of the form of equation (V) to achieve a $\Delta\Phi_{system}$ value which is substantially equal to zero. In the general case, such an equation will also include one or more terms which represent changes in the dimensions of the system's housing as a result of changes in temperature. It will also include the effects of a change in source wavelength $\lambda_S$ as a result of change in operating temperature. Thus, for a system containing "i" refractive components, "j" kinoform components, "k" stepped diffractive surfaces, and a housing composed of "l" components, each of which can undergo a different temperature change, equation (V) in its general form can be written:

$$\Delta\Phi_{system} = \sum_i \Phi_{R,i}(\lambda_s) \cdot X_{\Phi,R,i}(\lambda_s) \cdot \Delta T_i + \sum_j \Phi_{K,j}(\lambda_s) \cdot X_{\Phi,K,j} \cdot \Delta T_j + \quad \text{(VII)}$$
$$\sum_k \Phi_{SDS,k}^{Eff}(\lambda_s) \cdot X_{\Phi,SDS,k}(\lambda_s) \cdot \Delta T_k + \sum_l \Delta\Phi_{H,l} \cdot \Delta T_l$$

where $\Delta\Phi_{H,l}$ represents the change in the system's optical power resulting from a unit change in the temperature of the "lth" housing component and where the optical components making up the system can be composed of different materials so that the $X_{\Phi,R}(\lambda_S)$, $X_{\Phi,K}$, and $X_{\Phi,SDS}(\lambda_S)$ values need not be the same throughout the system. It should be noted that the term "housing" is used herein and in the claims in its broadest sense and includes any mechanical structure which supports any part of an optical system.

In addition to its athermalization aspects, the invention also provides improved methods for designing optical systems which employ stepped diffractive surfaces. In particular, the invention provides the ray tracing techniques set forth below.

The foregoing drawings, which are incorporated in and constitute part of the specification, illustrate various embodiments of the invention, and together with the description, serve to explain the principles of the invention. It is to be understood, of course, that both the drawings and the description are explanatory only and are not restrictive of the invention.

V. DESCRIPTION OF THE PREFERRED EMBODIMENTS

As discussed above, the present invention relates to the use of stepped diffractive surfaces to control, e.g., reduce, variation in the optical properties of an optical system as a result of a change in the temperature of all or a portion of the system. More particularly, using equations (IV), (VI), and (VII), the thermal behavior of one or more stepped diffractive surfaces can be balanced against the thermal behavior of the other components making up the optical system, as well as the thermal behavior of the system's housing in cases where the housing is not athermal.

A. Design Process for Optical Systems Employing Stepped Diffractive Surfaces

In the preferred embodiments of the invention, the stepped diffractive surface is treated as part of the optical system right from the beginning of the design process. There are several methods which potentially can be used in the design of an optical system that contains a diffractive optical element (DOE). The ones based on rigorous solutions of Maxwell equations as well as the ones based on solutions of Fresnel-Kirchhoff integral equations are almost impractical in multi-component optical systems with complex aspherical shapes. See M. G. Moharan and T. K. Gaylord, Diffraction Analysis of Surface-Relief Grating, JOSA, V. 72, No. 10, pp. 1385–1392, 1982; and E. G. Johnson and A. D. Kathman, Rigorous Electromagnetic Modeling of Diffractive Optical Elements, Proceedings SPIE, V. 1545, 1991, pp. 209–216.

The other three methods commonly used for systems with DOEs are ray-trace methods based on the Sweatt model or the phase model, or on vector ray propagation through recorded holograms. See W. C. Sweatt, Describing Holographic Optical Elements As Lenses, JOSA, V. 67, pp. 803–808, 1977; W. C. Sweatt, Mathematical Equivalence Between A Holographic Optical Element And An Ultra-High Index Lens, *JOSA*, V. 69, pp. 486–487, 1979; D. C. Sinclair, Designing Diffractive Optics Using The Sweatt Model, *Sinclair Optics Design Notes*, V. 1, No. 1, Winter 1990; *ZEMAX Optical Design Program. User's Guide,* Version 7.0, pp. 13–23, 13–24, Focus Software Inc., 1998; *OSLO Version 5. Optics Reference,* pp. 359–361, Sinclair Optics, Inc., 1996; D. A. Buralli, Optical design with diffractive lenses, *Sinclair Optics Design Notes,* V. 2, No. 4, 1991; W. T. Welford, Vector Raytracing Equation For Hologram Lenses of Arbitrary Shape, *Opt. Commun.*, V. 14, 322–323, 1975; and *Code V Reference Manual,* Version 8.20, pp. 2A-433, 2A-434, 1998.

Although the above models represent mathematical equivalency to the diffraction phenomenon, they do not explicitly specify the spacing and blaze angle of the grooves of the microstructure and do not account for actual physical changes of the microstructure as a result of temperature changes. The groove spacing (or frequency, the inverse number) is determined after the ray trace from the Sweatt lens parameters (index of refraction and radii of curvature), the phase polynomial, or the polynomials representing the wavefronts for a recorded hologram, for the above three models, respectively. The blaze angle is determined usually as a secondary procedure and involves optimization of the diffraction efficiency over the diffractive surface. See C. Londono and P. Clark, The design of achromatized hybrid diffractive lens system, *Proceedings SPIE,* V. 1354, pp. 30–37, 1990.

The above methods are not suited for ray tracing of stepped diffractive surfaces (SDSs) because they do not allow one to directly constrain the blaze angles of the diffractive microstructure, so that the solutions obtained with these methods will in general differ from the SDS geometry. Also, these methods do not allow one to take into account thermally induced aberrations of diffractive components.

Figure 2:
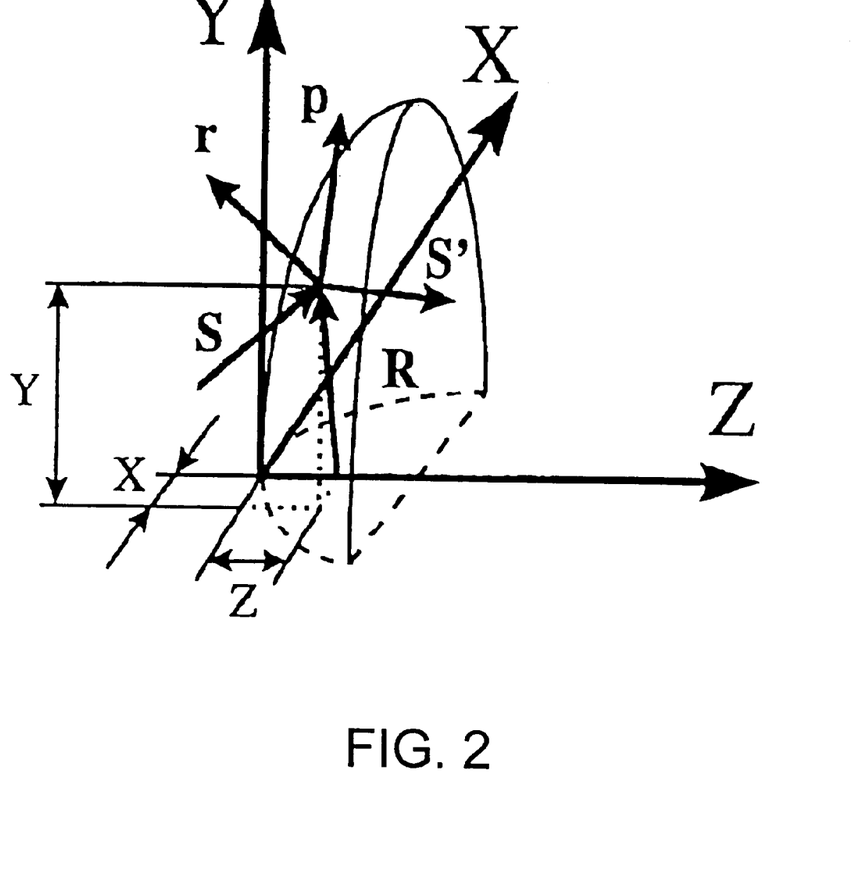
FIG. 2 illustrates the relationships of vectors r, p, S, S', and R which, in accordance with the invention, are used in performing ray tracing for a stepped active surface.

In accordance with the present invention, ray tracing of SDS elements is based on direct implementation of the grating equation in combination with constraining the diffractive geometry to a staircase shape. In brief, the method (1) employs the general ray trace method of Spencer and Murty, (2) constrains the micro-geometry, and (3) derives the local spacing of the grooves based on the substrate profile and the step height. See G. H. Spencer and M. V. R. K. Murty, General Ray-Tracing Procedure, *JOSA,* V. 52, pp. 672–678, 1962. The details of the method are as follows, where the vectors r, p, S, S', and R are illustrated in FIG. 2.

Consider a diffractive surface at the interface between two media with refractive indices $n_1$ and $n_2$. For ease of presentation, the surface will be assumed to have axial symmetry and to consist of circular diffractive step structures with the local spacing being a function of the radial coordinate. The step boundaries are defined by cylindrical and planar annular surfaces with their axis coinciding with the axis of symmetry of the lens. The shape of the surface substrate (base curve) could be any of the types used in optical design, including spheres, conics, polynomial aspheres, etc.

As shown by Spencer and Murty, the diffraction phenomenon of a ray propagating through the (diffractive) surface of a grating can be described by the following vector equation:

$$n_2(S' \times r) = n_1(S \times r) + \Lambda q \quad (1)$$

where the above vectors can be written in terms of their components as follows:

$$\begin{cases} S' = L'_s i + M'_s j + N'_s k \\ S = L_s i + M_s j + N_s k \\ r = L_r i + M_r j + N_r k \\ q = L_q i + M_q j + N_q k \end{cases} \quad (2)$$

The unit vectors S and S' define the propagation direction before and after the surface; r is a vector normal to the surface (base curve) at the ray intersection point. For the case of a diffractive structure with concentric rings (axisymmetric lens), q is a vector orthogonal to the plane of symmetry at the point of intersection, where the plane of symmetry is a plane defined by the optical axis and the normal to the SDS substrate at the point of intersection.

Parameter $\Lambda$ is a function of the diffractive structure (working order of diffraction j and local radial line spacing $w_i$) and the wavelength $\lambda$ associated with the propagating ray:

$$\Lambda = \frac{j\lambda}{w_i} \quad (3)$$

It is the second term of equation (1) that is responsible for the diffraction phenomenon. For the purely refractive case the term vanishes, so that the refracted ray lies in the plane defined by the incident ray and the normal to the surface at the point of intersection.

For the general case of an axisymmetrical diffractive structure, equation (1) can be rewritten as:

$$r \times_{n2} S' = r \times D^D, \quad (4)$$

where the vector $$D^D = {}_{n1}S + \Lambda p, \quad (5)$$

combines the effects of both refraction (first term) and diffraction (second term).

Vector $p = ui + vj + wk$ is a unit vector defined such that:

$$q = p \times r = (wM_r - vN_r)i + (uN_r - wL_r)j + (vL_r - uM_r)k \quad (6)$$

As shown in FIG. 2, vector p is tangential to the surface at the intersection point and lies in the plane of symmetry.

Equation (4) can be reduced to three equations for direction numbers (unnormalized direction cosines) of the ray after diffraction at the surface:

$$\begin{cases} L's = \frac{1}{n_2}(n_1 L_S + \Lambda u + \Gamma^D L_r); \\ M's = \frac{1}{n_2}(n_1 M_S + \Lambda v + \Gamma^D M_r); \\ N's = \frac{1}{n_2}(n_1 N_S + \Lambda w + \Gamma^D N_r); \end{cases} \quad (7)$$

where the multiplier $\Gamma^D$ is defined as follows:

$$\Gamma^D = -\frac{(L_r D^D_X + M_r D^D_Y + N_r D^D_Z)}{((L_r)^2 + (M_r)^2 + (N_r)^2)} + \frac{\sqrt{(L_r D^D_X + M_r D^D_Y + N_r D^D_Z)^2 + (n_2)^2 - ((D^D_X)^2 + (D^D_Y)^2 + (D^D_Z)^2)}}{((L_r)^2 + (M_r)^2 + (N_r)^2)}; \quad (8)$$

If $R = Xi + Yj$ is a vector at the point of intersection normal to the optical axis, then the directional cosines of vector p can be determined as:

$$u = -\frac{X}{|R|}\sin(R, r); \tag{9.1}$$

$$v = -\frac{Y}{|R|}\sin(R, r); \tag{9.2}$$

$$w = \frac{(XL_r + YM_r)}{|R|} = \cos(R, r) \tag{9.3}$$

Using (9), equations (7) and (8), describing ray propagation through the diffractive surface, can be rewritten as:

$$\begin{cases} L'_S = \frac{n_1}{n_2}L_S + \frac{1}{n_2}\left(-\Lambda X \sin\frac{(R,r)}{|R|} + \Gamma^D L_r\right); \\ M'_S = \frac{n_1}{n_2}M_S + \frac{1}{n_2}\left(-\Lambda Y \frac{\sin(R,r)}{|R|} + \Gamma^D M_r\right); \\ N'_S = \frac{n_1}{n_2}N_S + \frac{1}{n_2}(\Lambda \cos(R,r) + \Gamma^D \sin(R,r)); \end{cases} \tag{10.1}$$

$$\Gamma^D = \frac{1}{|r|^2}\left(-n_1\cos(r,S) + \sqrt{(n_2)^2 - (\Lambda + n_1\sin(r,S))^2}\right) \tag{10.2}$$

Using the grating equation:

$$_{n_2}\sin(S', r) = {_{n_1}}\sin(S, r) + \Lambda, \tag{10.3}$$

equation (10.2) can be also written as:

$$\Gamma^D = \frac{1}{|r|^2}(-n_1\cos(r, S) + n_2\cos(r, S')) \tag{10.4}$$

For an SDS with a step height of $d_i$ the local zone spacing $w_i(R, d_i)$ is determined as:

$$w_i(R, d_i) = d_i \left|\frac{\frac{\partial \varphi(R, z)}{\partial z}}{\frac{\partial \varphi(R, z)}{\partial R}}\right| = d_i \left(\left|\frac{dz}{dR}\right|\right)^{-1}; \tag{11}$$

where $\Phi(R, z)=0$ is the analytical definition of the substrate surface. If the substrate is explicitly described as a general aspheric surface of the form:

$$z = \frac{cR^2}{1 + \sqrt{1 - (1+k)c^2R^2}} + \sum_{i=1}^{i=NT} A_i(R)^{2i}, \tag{12}$$

where c is the vertex curvature, k is a conic constant, and NT is the total number of aspheric terms, then the zone spacing as a function of the radial coordinate R can be written as:

$$w_i(R, d_i) = \left(\left|\frac{cR}{\sqrt{1-(1+k)c^2R^2}} + 2\sum_{i=1}^{i=NT} iA_i(R)^{2i-1}\right|\right)^{-1} \cdot d_i \tag{13}$$

and the diffractive term $\Lambda$ is computed as follows from equation (3):

$$\Lambda = \frac{j\lambda}{d_i} \cdot \left|\frac{cR}{\sqrt{1-(1+k)c^2R^2}} + 2\sum_{i=1}^{i=NT} iA_i(R)^{2i-1}\right|. \tag{14}$$

The step depth $d_i$ can be variable if, for example, diffraction efficiency is to be optimized.

B. Calculation of Optothermal Coefficient For a Stepped Diffractive Surface

Consider a stepped diffractive surface where $d_i$ is chosen to be constant and to have a value $d_0$ given by:

$$d_0 = \left|\frac{j\lambda_0}{n_2 - n_1}\right| \tag{15}$$

where $\lambda_0$, as above, is the nominal operating wavelength.

An SDS with step height $d_0$ which satisfies equation (15) has zero paraxial power at the wavelength $\lambda_0$. The Optical Path Difference (OPD) in this case is equal to an integer number of $\lambda_0$'s and is defined as:

$$OPD = j\lambda_0 \tag{16}$$

When the OPD is not equal to an integer number of wavelengths, the direction of light is affected by diffraction so that the paraxial power of the SDS surface is no longer zero.

The diffractive term $\Lambda$ can also be written as:

$$\Lambda = \frac{OPD}{d_0}\frac{\partial \varphi/\partial z}{\partial \varphi/\partial R} \tag{17}$$

For an SDS surface with a base curve (fitted substrate) having a vertex radius of curvature $R_0$, employing (15) through (17), the diffractive term is defined as:

$$\Lambda = (n_2 - n_1)\frac{R}{R_0\sqrt{1 - (R/R_0)^2}} \tag{18}$$

For the paraxial case when $R_0 \gg R$, $$\Lambda = (n_2 - n_1)\frac{R}{R_0} \tag{19}$$

For light propagation from air into glass ($_{n_2}-_{n_1}>0$) and for a concave surface ($R_0<0$), the diffractive term is positive, $\Lambda>0$. For light propagation from glass into air ($_{n_2}-_{n_1}<0$) and for a concave surface ($R_0>0$), the diffractive term is also positive, $\Lambda>0$. When $R_0<0$ and $_{n_2}-_{n_1}<0$, as well as for $R_0>0$ and $_{n_2}-_{n_1}>0$, the diffractive term is negative, $\Lambda<0$.

For the paraxial domain, accounting for the grating equation (10.3), the ray deviation from its original direction can be written:

$$\sin(S', S) = \frac{1}{n_2}\left((n_1 - n_2)\frac{R}{R_0} - \Lambda\right) \tag{20}$$

When the incident ray is parallel to the optical axis, angle (S,S') determines the power of the SDS surface. In particular, the power of the SDS surface can be calculated as:

$$\Phi_{SDS} = \frac{n_2\sin(S', S)}{R} = \frac{(n_2 - n_1)}{R_0} + \frac{\Lambda}{R} \tag{21}$$

where $\Phi_{SDS}=0$ at the nominal temperature.

The optothermal coefficient $X_{\Phi,SDS}$ for the SDS surface is obtained by differentiating equation (21):

$$X_{\Phi,SDS} = \frac{1}{\Phi_{SDS}^{Eff}} \frac{d(\Phi_{SDS})}{dT} = \frac{1}{(n_2-n_1)}\left(\frac{dn_1}{dT} - \frac{dn_2}{dT}\right) - \alpha \quad (22)$$

where the effective power $\Phi_{SDS}^{Eff}$ of the SDS surface is defined as:

$$\Phi_{SDS}^{Eff} = -\frac{(n_2-n_1)}{R_0} = \frac{\Lambda}{R} \quad (23)$$

The power acquired by the SDS due to a change in temperature is then calculated to be:

$$\Delta\Phi_{SDS} = \frac{d(\Phi_{SDS})}{dT}\Delta T = \Phi_{SDS}^{Eff} X_{\Phi,SDS} \Delta T \quad (24)$$

where $X_{\Phi,SDS}$ is the optothermal coefficient defined by equation (22).

From equations (23) and (24), we can see that for a positive temperature increment $\Delta T > 0$, a material with positive optothermal coefficient $X_{\Phi,SDS} > 0$, and the case when $n_2 > n_1$, the SDS surface acquires negative power for $R_0 > 0$ and positive power for $R_0 < 0$. For $\Delta T > 0$, $X_{\Phi,SDS} > 0$, and $n_2 < n_1$, on the other hand, the SDS surface acquires negative power when $R_0 < 0$ and positive power when $R_0 > 0$.

As can be seen from Table 1, the optothermal coefficient for an SDS surface is positive for optical plastics and for NaCl and $CaF_2$. For IR materials such as Si, Ge, ZnSe and for the optical glasses BK7 and F1, the optothermal coefficient for an SDS surface is negative ($X_{\Phi,SDS} < 0$) and the relations above are reversed.

The magnitudes of the $X_{\Phi,SDS}$ values set forth in Table 1 show that stepped diffractive surfaces made out of a variety of materials can be effectively used to reduce the thermal variation of optical systems. For example, as shown in this table, the infrared materials Si, Ge, and ZnSe have $X_{\Phi,SDS}$ values which exceed those for both refractive elements and kinoforms. Similarly, for acrylic and polycarbonate, the optothermal coefficient for a stepped diffractive surface is about 50% of that for a refractive element and about equal to that of a kinoform surface.

The stepped diffractive surfaces of the invention can be made using a variety of techniques now known or subsequently developed. Examples of such techniques including machining of individual elements using, for example, a diamond turning machine or, more preferably, producing a master mold and forming elements having the desired diffractive surface using injection molding techniques. Elements having stepped diffractive surfaces, especially when made by molding, will generally be composed of a plastic material, e.g., an acrylic polymer, although other materials, e.g., glass materials, can be used if desired.

Without intending to limit it in any manner, the present invention will be more fully described by the following example.

EXAMPLE

Figure 3A:
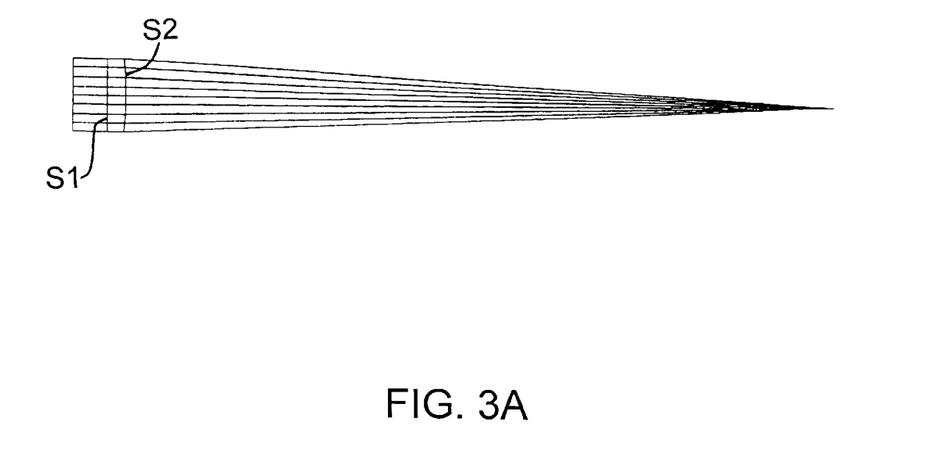
FIG. 3A is a schematic side view of a refractive singlet whose optical properties are temperature dependent.

FIG. 3A shows a refractive singlet having surfaces S1 and S2. The prescription for this lens is set forth in the first column of Table 2, where surface S2 is defined by the equation:

$$z = \frac{(r)^2/R2}{1+\sqrt{1-(1+K2)\cdot(r)^2/(R2)^2}} + D2(r)^4 + E2(r)^6$$

where "r" is a radial coordinate measured from the lens' optical axis and "z" is the surface's sag.

Figure 4A:
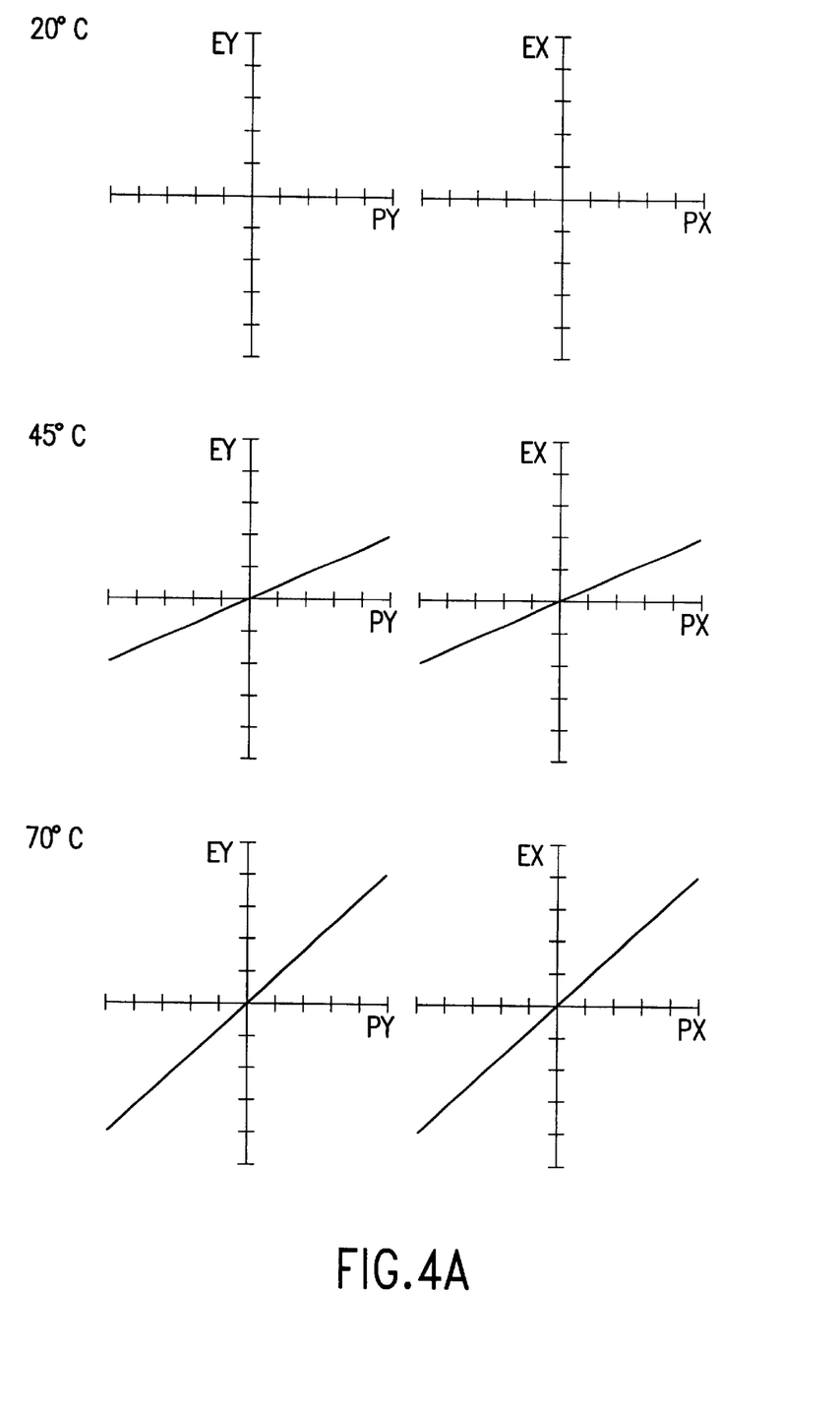
FIG. 4A shows the calculated optical performance of the singlet of FIG. 3A at temperatures of 20° C., 45° C., and 70° C.

The calculated thermal behavior of the lens of FIG. 3A is shown in FIG. 4A, where PX and PY are pupil (stop) coordinates and EX and EY are field coordinates. For perfect imaging, all rays go to the axis so that EX and EY are zero for all PX and PY values.

As shown in FIG. 4A, the refractive singlet of FIG. 3A achieves perfect imaging at 20° C., but exhibits significant amounts of defocus as the temperature is increased to 45° C. and 700° C., the amount of defocus being proportional to the temperature change.

Figure 3B:
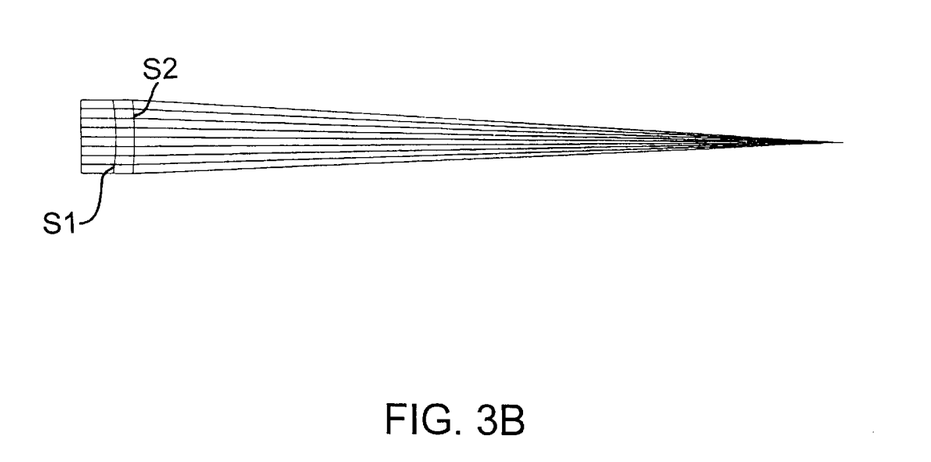
FIG. 3B is a schematic side view of a singlet employing a stepped diffractive surface whose optical properties are athermal.

FIG. 3B shows an athermal hybrid singlet constructed in accordance with the invention. The prescription for this lens is set forth in the second column of Table 2. As shown therein, this lens has the same effective focal length and the same f/# as the lens of FIG. 3A. It also has the same nominal center thickness and the same surface S2. It differs from the lens of FIG. 3A in that surface S1 is a stepped diffractive surface having a circular base curve of radius −59.5 mm. The prescription for this surface is set forth in Table 3.

Figure 4B:
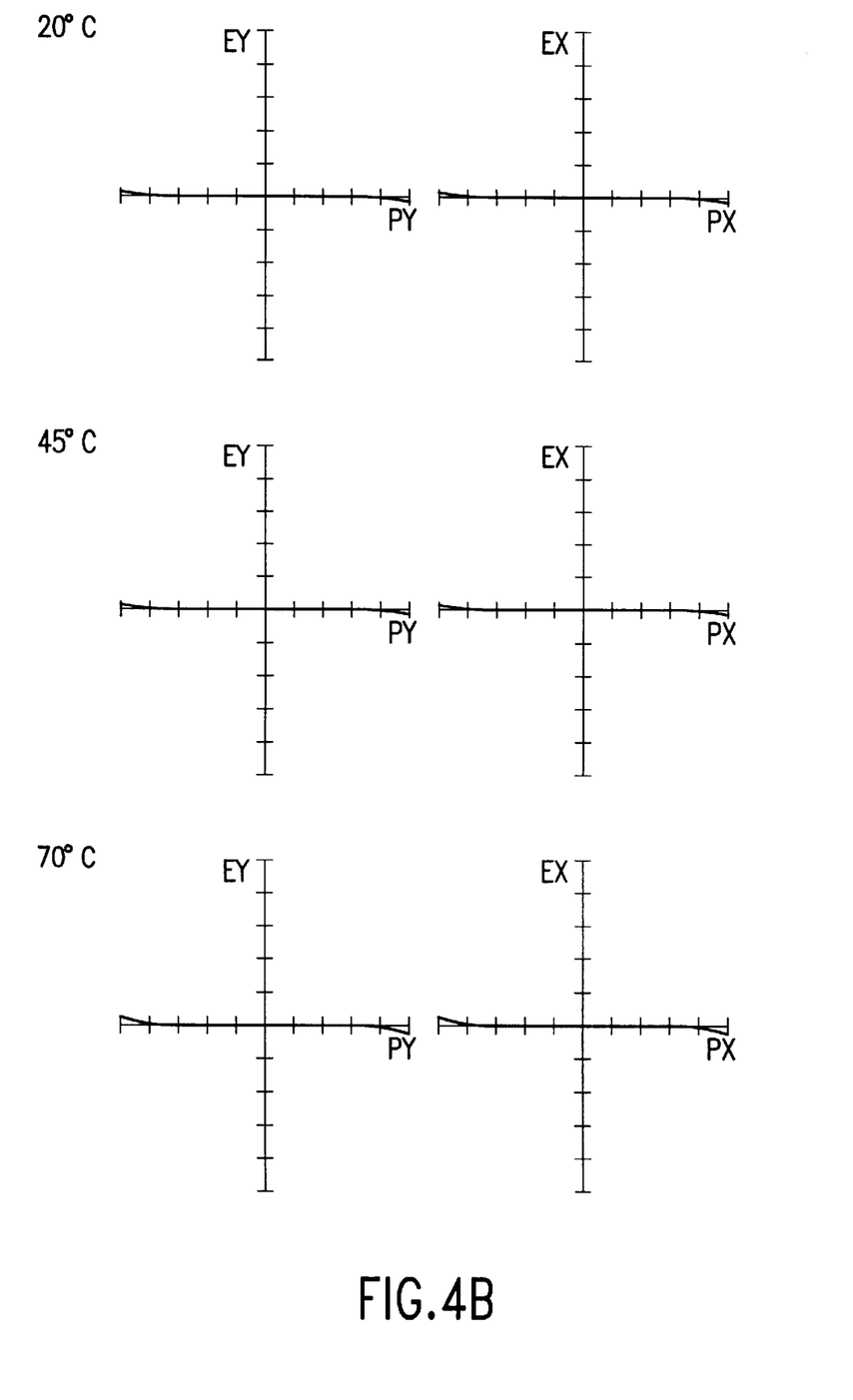
FIG. 4B shows the calculated optical performance of the singlet of FIG. 3B at temperatures of 20° C., 45° C., and 70° C.

As shown in FIG. 4B, through the use of a stepped diffractive surface, the degradation in the optical performance of the lens of FIG. 3A with a change in temperature has been essentially completely eliminated. The ray aberration curves of FIG. 4B show that the SDS surface has introduced a small amount of spherical aberration, the magnitude of which is thermally dependent. Significantly, however, the thermal defocus of the refractive singlet of FIG. 3A is more than 20 times the amount of spherical aberration introduced by the athermal hybrid of FIG. 3B.

The third column of Table 2 sets forth a prescription for an athermal hybrid which eliminates the spherical aberration exhibited by the lens of FIG. 3B. Surface S2 of this hybrid has non-zero aspherical coefficients D2 and E2. Otherwise, this lens is identical to that of FIG. 3B. At the resolution of FIGS. 4A and 4B, i.e., ±200 microns, the performance curves for this lens (not shown) show no deviation from the PX and PY axes as the temperature is increased from 20° C. to 70° C. The performance of this lens is essentially diffraction limited over this range of temperatures.

The refractive singlet of the first column of Table 2 and the athermal hybrid of the second column were prepared and tested using an environmental chamber which allowed the element's temperature to be varied between 20° C. and 50° C. The refractive singlet and the athermal hybrid were prepared by diamond turning.

Testing was performed by using the element to form an image of a target on a screen and visually observing changes in the location of the image as the temperature of the element was increased from 20° C. to 50° C. Noticeable changes in image location were observed for the refractive singlet. In contrast, no detectable change in image location was observed for the athermal hybrid.

Although preferred and other embodiments of the invention have been described herein, further embodiments may be perceived by those skilled in the art without departing from the scope of the invention as defined by the following claims.

TABLE 1

Physical Properties of Representative Optical Materials*

| Material | Index $n_d$ | $\alpha_g \times 10^{-6}$ °C.$^{-1}$ | dn/dT $\times 10^{-6}$ °C.$^{-1}$ | $x_{\Phi,R} \times 10^{-6}$ °C.$^{-1}$ | $x_{\Phi,K} \times 10^{-6}$ °C.$^{-1}$ | $x_{\Phi,SDS} \times 10^{-6}$ °C.$^{-1}$ | $x_{\Phi,K}/x_{\Phi,R}$ | $x_{\Phi,SDS}/x_{\Phi,R}$ | $x_{\Phi,SDS}/x_{\Phi,K}$ |
|---|---|---|---|---|---|---|---|---|---|
| BK7 | 1.517 | 7.10 | 1.70 | -0.98 | -13.24 | -12.25 | 13.46 | 12.46 | 0.93 |
| F1 | 1.626 | 8.70 | 2.30 | -2.52 | -16.44 | -13.91 | 6.52 | 5.52 | 0.85 |
| Acrylic | 1.495 | 64.80 | -125.00 | -314.41 | -128.64 | 185.78 | 0.41 | -0.59 | -1.44 |
| Polycarbonate | 1.585 | 65.50 | -107.00 | -245.79 | -130.04 | 115.76 | 0.53 | -0.47 | -0.89 |
| NaCl | 1.490 | 44.00 | -25.00 | -92.09 | -87.04. | 5.05 | 0.95 | -0.05 | -0.06 |
| CaF2 | 1.434 | 18.90 | -9.80 | -38.30 | -36.84 | 1.46 | 0.96 | -0.04 | -0.04 |
| Si | 3.420 | 4.20 | 162.00 | 64.10 | -7.44 | -71.54 | -0.12 | -1.12 | 9.62 |
| Ge | 4.000 | 6.10 | 270.00 | 85.19 | -11.24 | -96.42 | -0.13 | -1.13 | 8.58 |
| ZnSe | 2.400 | 7.70 | 48.00 | 28.24 | -14.44 | 42.67 | -0.51 | -1.51 | 2.96 |

*The optothermal coefficients $x_{\Phi,R}$, $x_{\Phi,K}$, and $x_{\Phi,SDS}$ were computed assuming that light travels from air (the $n_1$ medium) into the material which forms the refractive, kinoform, or SDS surface (the $n_2$ medium). The values reported include the effects of the refractive index change of air with a change in temperature. In particular, the value of $\frac{dn_1}{dT}$ was taken to be equal to $-0.965 \times 10^{-6}$ °C.$^{-1}$ for air at $\lambda = 0.55\mu$ and T = 15° C. See T. H. Jamieson, Thermal effects in optical systems, Opt. Eng. V. 20, pp. 156–160, 1981.

TABLE 2

| Parameter | Refractive Singlet | Athermal Hybrid #1 | Athermal Hybrid #2 |
|---|---|---|---|
| Effective Focal Length, mm | 204.2 | 204.2 | 204.2 |
| F/190 | 10.25 | 10.24 | 10.25 |
| Material | Acrylic | Acrylic | Acrylic |
| Clear Aperture, mm | 20 | 20 | 20 |
| Center Thickness, mm | 5.25 | 5.25 | 5.25 |
| Back Focal Length, mm | 204.2 | 204.2 | 204.2 |
| Defocus @ 20 Deg., mm | 0.0 | 0.0 | 0.0 |
| Defocus @ 45 Deg., mm | 1.6 | 0.0 | 0.0 |
| Defocus @ 70 Deg., mm | 3.3 | 0.0 | 0.0 |
| Surface #1 | Infinity | -59.5 | -59.5 |
| Radius R1, mm | | | |
| Surface #2 | -100.0 | -100.0 | -100.0 |
| Radius R2, mm | | | |
| Conic Constant K2 | -2.2194 | -2.2194 | 3.5405 |
| Coeff. D2 | 0 | 0 | 7.1852E-07 |
| Coeff. E2 | 0 | 0 | 2.0033E-10 |

TABLE 3

| Step Number | Radial Coordinate, mm |
|---|---|
| 1 | 0.39211 |
| 2 | 0.55452 |
| 3 | 0.67914 |
| 4 | 0.7842 |
| 5 | 0.87676 |
| 6 | 0.96044 |
| 7 | 1.03739 |
| 8 | 1.10901 |
| 9 | 1.17627 |
| 10 | 1.23989 |
| 11 | 1.3004 |
| 12 | 1.35822 |
| 13 | 1.41367 |
| 14 | 1.46703 |
| 15 | 1.51851 |
| 16 | 1.5683 |
| 17 | 1.61656 |
| 18 | 1.66342 |
| 19 | 1.70899 |
| 20 | 1.75338 |
| 21 | 1.79667 |
| 636 | 9.85444 |
| 637 | 9.86213 |
| 638 | 9.86981 |
| 639 | 9.87749 |
| 640 | 9.88516 |
| 641 | 9.89283 |

TABLE 3-continued

| Step Number | Radial Coordinate, mm |
|---|---|
| 642 | 9.90049 |
| 643 | 9.90814 |
| 644 | 9.91579 |
| 645 | 9.92343 |
| 646 | 9.93107 |
| 647 | 9.93869 |
| 648 | 9.94632 |
| 649 | 9.95394 |
| 650 | 9.96155 |
| 651 | 9.96915 |
| 652 | 9.97675 |
| 653 | 9.98434 |
| 654 | 9.99193 |
| 655 | 9.99951 |

Index of refraction 1.4898
Primary Wavelength (micrometers) 0.6328
Clear Aperture Radius (mm) 10.0000
Total sag of circular base curve between clear aperture and optical axes (mm) -0.8464
Step Height (micrometers) 1.292
Number of Zones 655
Surface Shape is Concave

What is claimed is:

1. A method for at least partially controlling a change in an optical property of an optical system resulting from a change in the temperature of at least a portion of the system, said system having an optical axis and comprising at least one lens element having an index of refraction, a shape, and a location within the optical system, said method comprising:

(A) including at least one stepped diffractive surface in the system, said at least one stepped diffractive surface comprising N concentric planar zones which:
   (i) are orthogonal to the system's optical axis,
   (ii) are displaced from one another along the optical axis, the displacement between zone i and zone i+1 being $d_i$, and
   (iii) define a base curve, said stepped diffractive surface having a clear aperture and a sag which changes monotonically from the optical axis to the clear aperture; and (B) selecting the base curve and the $d_i$ at least in part to compensate for a change in the index of refraction, shape, and/or location of said at least one lens element as a result of said change in temperature to at least partially control the change in the optical property.

2. A method for at least in part controlling a change in an optical property of an optical system resulting from a change in the temperature of at least a portion of the system, said system having an optical axis and a nominal operating wavelength $\lambda_0$, and comprising at least one lens element having an index of refraction, a shape, and a location within the optical system, said method comprising:

(A) including at least one stepped diffractive surface in the system, said at least one stepped diffractive surface:
  (i) separating a first medium having an index of refraction $n_1$ from a second medium having an index of refraction $n_2$;
  (ii) having a working diffractive order "j" which may be constant or variable; and
  (iii) comprising N concentric planar zones orthogonal to the system's optical axis which define a base curve, said zones satisfying the relationship:

$$|d_i \equiv j\lambda_0/|(n_2-n_1)|, \text{ for } i=1 \text{ to } N-1,$$

where $d_i$ is the displacement along the optical axis between zone i and zone i+1; and (B) selecting the base curve and the $d_i$ at least in part to compensate for a change in the index of refraction, shape, and/or location of said at least one lens element as a result of said change in temperature to at least partially control the change in the optical property.

3. The method of claim 1 or 2 wherein the optical system forms an image of an object and the optical property is the location of the image along the optical axis.

4. The method of claim 1 or 2 wherein the optical system has a focal length and the optical property is the magnitude of the focal length.

5. The method of claim 1 or 2 wherein the optical system has a magnification and the optical property is the magnitude of the magnification.

6. The method of claim 1 or 2 wherein the at least one lens element has a non-zero optical power and the base curve and the $d_i$ are selected at least in part to compensate for a change in said non-zero optical power resulting from a change in the temperature of said at least one lens element.

7. The method of claim 1 or 2 wherein the optical system includes a housing and the base curve and the $d_i$ are selected at least in part to compensate for a change in the location of the at least one lens element caused by a change in a dimension of said housing resulting from a change in the temperature of the housing.

8. The method of claim 1 wherein:

(a) the optical system has a nominal operating wavelength $\lambda_0$;
(b) the stepped diffractive surface:
  (i) separates a first medium having an index of refraction $n_1$ from a second medium having an index of refraction $n_2$,
  (ii) is formed of a material having an expansion coefficient $\alpha$,
  (iii) has a base curve of radius $R_0$ at the optical axis, and
  (iv) undergoes a change in temperature $\Delta T$; and
(c) the base curve and the $d_i$ are selected at least in part based on the equations:

$$\Delta\Phi_{SDS} = \Phi^{Eff}_{SDS} \cdot X_{\Phi,SDS} \cdot \Delta T;$$

$$\Phi^{Eff}_{SDS} = -\frac{(n_2 - n_1)}{R_0}; \text{ and}$$

$$X_{\Phi,SDS} = \frac{1}{(n_2 - n_1)}\left(\frac{dn_1}{dT} - \frac{dn_2}{dT}\right) - \alpha$$

where $\Delta\Phi_{SDS}$ is the change in the paraxial optical power of the stepped diffractive surface at $\lambda_0$ as a result of the change in temperature $\Delta T$.

9. The method of claim 2 wherein:

(a) the stepped diffractive surface:
  (i) is formed of a material having an expansion coefficient $\alpha$,
  (ii) has a base curve of radius $R_0$ at the optical axis, and
  (iii) undergoes a change in temperature $\Delta T$; and
(b) the base curve and the $d_i$ are selected at least in part based on the equations:

$$\Delta\Phi_{SDS} = \Phi^{Eff}_{SDS} \cdot X_{\Phi,SDS} \cdot \Delta T;$$

$$\Phi^{Eff}_{SDS} = -\frac{(n_2 - n_1)}{R_0}; \text{ and}$$

$$X_{\Phi,SDS} = \frac{1}{(n_2 - n_1)}\left(\frac{dn_1}{dT} - \frac{dn_2}{dT}\right) - \alpha$$

where $\Delta\Phi_{SDS}$ is the change in the paraxial optical power of the stepped diffractive surface at $\lambda_0$ as a result of the change in temperature $\Delta T$.

10. The method of claim 1 or 2 wherein:

$$|d_i|\backslash|d_{i+1}|=1.0, \text{ for } i=1 \text{ to } N-1.$$

11. The method of claim 1 or 2 wherein:

$$|d_i|\backslash|d_{i+1}|<2.0, \text{ for } i=1 \text{ to } N-2.$$

12. An optical system which has an optical axis and an operating temperature within a range of temperatures, said system comprising:

(a) at least one stepped diffractive surface which comprises N concentric planar zones which:
  (i) are orthogonal to the system's optical axis,
  (ii) are displaced from one another along the optical axis, the displacement between zone i and zone i+1 being $d_i$, and
  (iii) define a base curve, said stepped diffractive surface having a clear aperture and a sag which changes monotonically from the optical axis to the clear aperture;
(b) at least one optical surface which (i) is not a stepped diffractive surface and (ii) has a non-zero optical power; and
(c) a housing which supports the at least one stepped diffractive surface and the at least one optical surface;

wherein the at least one stepped diffractive surface compensates for changes in the at least one optical surface and/or the housing as a result of changes in the system's operating temperature.

13. An optical system which (i) has an optical axis, (ii) has a nominal operating wavelength $\lambda_0$, and (iii) has an operating temperature within a range of temperatures, said system comprising:

(a) at least one stepped diffractive surface which:
  (i) separates a first medium having an index of refraction $n_1$ from a second medium having an index of refraction $n_2$;
  (ii) has a working diffractive order "j" which may be constant or variable; and (iii) comprises N concentric planar zones orthogonal to the system's optical axis which define a base curve, said zones satisfying the relationship:

$|d_i|=j\lambda_0/|(n_2-n_1)|$, for $i=1$ to $N-1$, where $d_i$ is the displacement along the optical axis between zone i and zone i+1;

(b) at least one optical surface which (i) is not a stepped diffractive surface and (ii) has a non-zero optical power; and (c) a housing which supports the at least one stepped diffractive surface and the at least one optical surface;

wherein the at least one stepped diffractive surface compensates for changes in the at least one optical surface and/or the housing as a result of changes in the system's operating temperature.

14. The optical system of claim 12 or 13 wherein the at least one optical surface comprises a refractive surface.

15. The optical system of claim 12 or 13 wherein the at least one optical surface comprises a kinoform.

16. The optical system of claim 12 or 13 wherein the at least one optical surface comprises a reflective surface.

17. The optical system of claim 12 wherein:

(a) the optical system has a nominal operating wavelength $\lambda_0$;

(b) the stepped diffractive surface:
  (i) separates a first medium having an index of refraction $n_1$ from a second medium having an index of refraction $n_2$,
  (ii) is formed of a material having an expansion coefficient $\alpha$,
  (iii) has a base curve of radius $R_0$ at the optical axis, and
  (iv) undergoes a change in temperature $\Delta T$; and (c) the base curve and the $d_i$ are selected at least in part based on the equations:

$$\Delta\Phi_{SDS} = \Phi_{SDS}^{Eff} \cdot X_{\Phi,SDS} \cdot \Delta T;$$

$$\Phi_{SDS}^{Eff} = -\frac{(n_2-n_1)}{R_0}; \text{ and}$$

$$X_{\Phi,SDS} = \frac{1}{(n_2-n_1)}\left(\frac{dn_1}{dT} - \frac{dn_2}{dT}\right) - \alpha$$

where $\Delta\Phi_{SDS}$ is the change in the paraxial optical power of the stepped diffractive surface at $\lambda_0$ as a result of the change in temperature $\Delta T$.

18. The optical system of claim 13 wherein:

(a) the stepped diffractive surface:
  (i) is formed of a material having an expansion coefficient $\alpha$,
  (ii) has a base curve of radius $R_0$ at the optical axis, and
  (iii) undergoes a change in temperature $\Delta T$; and (b) the base curve and the $d_i$ are selected at least in part based on the equations:

$$\Delta\Phi_{SDS} = \Phi_{SDS}^{Eff} \cdot X_{\Phi,SDS} \cdot \Delta T;$$

$$\Phi_{SDS}^{Eff} = -\frac{(n_2-n_1)}{R_0}; \text{ and}$$

$$X_{\Phi,SDS} = \frac{1}{(n_2-n_1)}\left(\frac{dn_1}{dT} - \frac{dn_2}{dT}\right) - \alpha$$

where $\Delta\Phi_{SDS}$ is the change in the paraxial optical power of the stepped diffractive surface at $\lambda_0$ as a result of the change in temperature $\Delta T$.

19. The optical system of claim 12 or 13 wherein:

$|d_i|\backslash|d_{i+1}|=1.0$, for $i=1$ to $N-1$.

20. The method of claim 12 or 13 wherein:

$|d_i|\backslash|d_{i+1}|<2.0$, for $i=1$ to $N-2$.

21. An optical element comprising two optical surfaces wherein:

(a) one of the optical surfaces comprises a stepped diffractive surface formed in a substrate, said stepped diffractive surface having an optothermal coefficient which depends on dn/dT, where n is the index of refraction of the substrate and T is temperature;

(b) the other of the optical surfaces (i) is not a stepped diffractive surface and (ii) has a non-zero optical power;

(c) the stepped diffractive surface compensates for changes in the other optical surface as a result of changes in the element's temperature; and (d) at a nominal wavelength $\lambda_0$, the stepped diffractive surface has zero paraxial power.

22. The optical element of claim 21 wherein the element has an optical power and the compensation holds said optical power substantially constant over a predetermined range of temperatures for at least one operating wavelength.

23. The method of claim 1 or 2 wherein:

(1) the optical system comprises at least one optical surface which (i) is not a stepped diffractive surface and (ii) has a non-zero optical power, said at least one optical surface having at least one monochromatic aberration (the non-SDS aberration);

(2) the at least one stepped diffractive surface has at least one monochromatic aberration (the SDS aberration); and (3) the non-SDS aberration and the SDS aberration are substantially balanced against one another.

24. The optical system of claim 12 or 13 wherein:

(1) the at least one optical surface which is not a stepped diffractive surface and has a non-zero optical power has at least one monochromatic aberration (the non-SDS aberration);

(2) the at least one stepped diffractive surface has at least one monochromatic aberration (the SDS aberration); and (3) the non-SDS aberration and the SDS aberration are substantially balanced against one another.

25. The optical element of claim 21 wherein the stepped diffractive surface compensates only for changes in the other optical surface as a result of changes in the element's temperature.

* * * * *